Dec. 23, 1930. E. G. SCHLEICHER 1,786,266
STABILIZING DEVICE FOR AEROPLANES
Filed Sept. 18, 1929
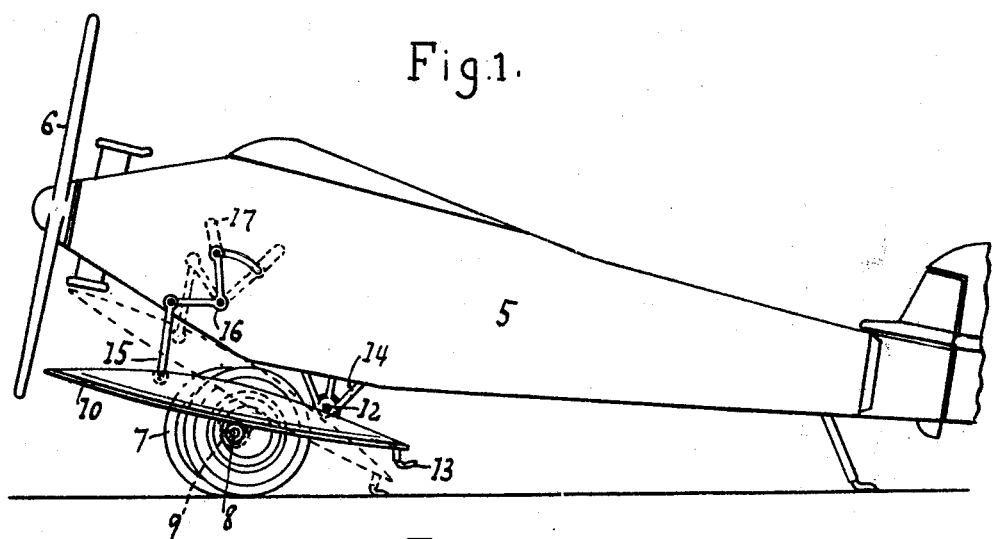
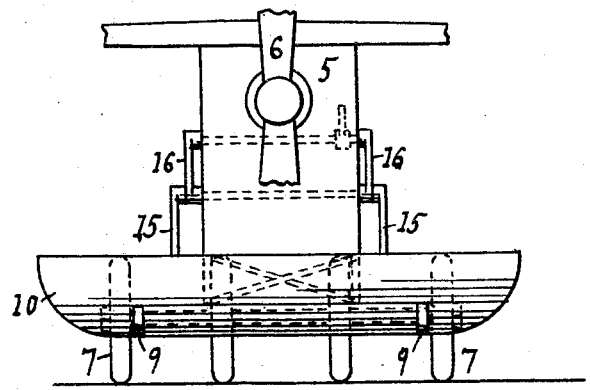
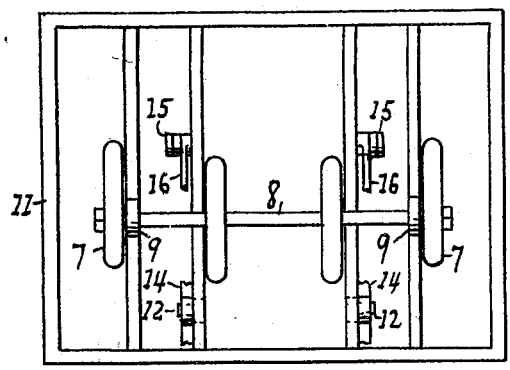
Inventor
Edward G. Schleicher
By his Attorneys
Hauff & Warland Patented Dec. 23, 1930

1,786,266

UNITED STATES PATENT OFFICE

EDWARD G. SCHLEICHER, OF MOUNT VERNON, NEW YORK

STABILIZING DEVICE FOR AEROPLANES

Application filed September 18, 1929. Serial No. 393,396.

This invention relates to a stabilizing device for aeroplanes and it includes an auxiliary wing arranged in proximity or connected to the landing gear so that in making a bad or forced landing the front end of the fuselage will be forced upward by the pressure of the air crowded under the wing.

The invention is designed to provide the aeroplane with a movable wing mounted under the front or nose of the fuselage which is moved into action by the operator while rolling along the ground thereby crowding the air between the wing and the ground making it possible to ascend in a shorter space. When making a landing the wing can be moved to a desired angle thereby acting as a brake by its resistance of the air forced against said wing.

In the above invention the location of the wing under the forward portion of the fuselage has sufficient buoyancy to keep the aeroplane afloat when it lands in the water.

The present invention is preferably used in connection with the landing gear described in the U. S. Patent No. 1,705,210 granted to me March 12, 1929, but it will be understood that it can be applied to any type of aeroplane.

The invention resides more particularly in the novel combinations hereinafter described and claimed, reference being made to the accompanying drawing in which:

Fig. 1 represents a side elevation of an aeroplane embodying this invention.

Fig. 2 is a front elevation thereof.

Fig. 3 is an inverted plan view of the wing frame.

In the drawing is shown an aeropane having a fuselage 5 and a propeller 6 for driving the aeroplane forward as is well known. The landing gear comprises four wheels 7, each provided with a pneumatic tire for contact with the ground. The wheels are eccentrically mounted on an axle 8 which is connected to a wing 10 by means of lugs 9 fixed to the frame 11 of the wing.

The stabilizing device to assist in making a landing or elevating the aeroplane, consists of a wing 10 having an arcuate top and bottom with a pointed forward and rear end, as indicated in Fig. 1. The sides of the wing are also curved as indicated in Fig. 2. The wing is usually covered by waterproof fabric, such as linen or other suitable material, which is drawn over a frame 11 made of wood. The frame is arranged in proximity to the landing gear, and in order to give play room to the wheel and connections, the fabric can be provided with openings not shown.

The wing is swingingly mounted on trunnions 12 and struts 14 secured to the fuselage, are adapted to support said trunnions. The devices for oscillating the wing include, links 15 pivoted at the forward portion of the wing to the frame and bell crank levers 16 each fulcrumed to the side of the fuselage and pivoted to the link. The bell crank levers are actuated by a handle 17 within convenient reach of the operator.

When the aeroplane is in the air and driven forward the wing is set as shown in full lines parallel to the main wing, and by reason of its peculiar shape it offers very little resistance to the air. When it is desired to descend and within a short distance from the earth, the operator actuates the handle and the wing is oscillated so that the forward end tilts upward, as indicated in dotted lines. A skid 13 at the rear end slides along the ground preventing injury to the wing. In this position the wing, by the pressure of the air under it and a partial vacuum formed over the top, transmits a lifting movement to the nose of the fuselage thereby obviating tail spin or nose dive. After the wing is in the position indicated in full lines in Fig. 1 it is balanced by the weight of the landing gear which tends to pull the forward end of the wing downward within the limits of the forward movement of the bell crank lever. In a device of the kind described, the up or down oscillation of the forward part of the wing is controlled by the position of the bell crank lever.

I claim:

1. In a stabilizing device for aeroplanes the combination with a wing arranged under the forward portion of a fuselage, a landing gear having an axle connected to the wing, of means secured behind the axle for swingingly mounting the wing, the weight of the landing gear gravitating the forward portion of the wing downward, and devices arranged at the forward portion of the wing for limiting the upward and downward oscillation of the wing.

2. In a stabilizing device for aeroplanes the combination with an arcuate wing arranged under the forward portion of the fuselage, a landing gear having an axle connected to the wing, of means fulcrumed to the fuselage behind the axle for swingingly mounting the wing so that the weight of the landing gear will gravitate the forward portion of the wing downward, a link pivoted to the forward portion of the wing, and a bell crank lever connected to the link for actuating the wing to oscillate the forward end thereof upward or downward within predetermined limits.

In testimony whereof I have hereunto set my hand.

EDWARD G. SCHLEICHER.